United States Patent [19]
Rich et al.

[11] 3,820,121
[45] June 25, 1974

[54] APPARATUS FOR EXPRESSING A WRITING FLUID

[75] Inventors: Leonard G. Rich; Heinz Joseph Gerber, both of West Hartford, Conn.

[73] Assignee: The Gerber Scientific Instrument Company, South Windsor, Conn.

[22] Filed: Oct. 13, 1972

[21] Appl. No.: 297,285

[52] U.S. Cl. .............................................. 346/140
[51] Int. Cl. ........................................... G01d 15/16
[58] Field of Search ............................. 346/140, 75

[56] References Cited
UNITED STATES PATENTS

| | | | |
|---|---|---|---|
| 3,169,821 | 2/1965 | Miller | 346/140 |
| 3,327,315 | 6/1967 | Felton | 346/140 |
| 3,335,424 | 8/1967 | Hartai | 346/140 |
| 3,610,782 | 10/1971 | McGuire | 417/326 |

Primary Examiner—Joseph W. Hartary
Attorney, Agent, or Firm—McCormick, Paulding & Huber

[57] ABSTRACT

In a plotting device, a plotting pen and a recording medium are moved relative to one another in accordance with plotting commands to cause the pen to produce a line trace on the medium. A pump is connected to the pen to pressurize the writing fluid in the pen and thereby increase the rate at which the writing fluid is expressed during high speed plotting operations. The pump is driven by a motor controlled in accordance with the rate of relative movement between the pen and recording medium so that the writing fluid in the pen is pressurized by the pump exclusively at higher plotting speeds. With the additional pressurization the pen is capable of dispensing writing fluid to produce continuous and uniform lines at both low and high plotting speeds.

11 Claims, 5 Drawing Figures

3,820,121

APPARATUS FOR EXPRESSING A WRITING FLUID

BACKGROUND OF THE INVENTION

The present invention relates to automatic plotting or drafting systems in which a plotting pen and recording medium are moved relative to one another in accordance with plotting commands from a controller to produce line traces or other graphical information on the medium. More particularly, the invention relates to a method and apparatus for expressing a writing fluid from the plotting pen so that the quality of the line traces and graphic information recorded by the pen does not deteriorate at higher plotting speeds.

Plotting devices in the current state of the art are capable of speeds approaching 3,000 inches per minute (ipm). Such speeds can be obtained by drum plotters of the type shown in copending U.S. Pat. application Ser. No. 401,572 filed Sept. 28, 1973 and having the same assignee as the present invention. Another type of plotter capable of such speeds is disclosed in U.S. Pat. No. 3,376,578 and employs a magnetic head supported on a fluid bearing to carry the plotting pen over the recording medium spread on a cooperating magnetic platen.

Also, table plotting systems, although not quite as fast as the above-referenced systems, are capable of plotting speeds approaching 2,000 ipm. In a table plotting system such as disclosed in U.S. Pat. No. 3,473,009 having the same assignee as the present invention, a plotting pen is supported in moveable carriages which are translated in two coordinate directions over a table supporting the recording medium.

In all of the above-described plotting systems, conventional plotting pens are incapable of producing continuous, high contrast traces which are uniform in dimension, tone and other qualities as the plotting speed increases above a particular value in a range of 200–400 ipm. At low plotting speeds, that is below 200 ipm, a standard wetting pen or wet ink pen dispenses liquid ink from a reservoir in a normal manner, that is, through the combined forces of capillary action, gravity and the action of the fluid meniscus between the pen and recording medium. Uniform line quality at the lower speeds is automatically achieved by such forces. However, line quality deteriorates at higher speeds where the conventional forces can no longer deposit the same quantity of writing fluid per unit length of line. Line quality, accordingly, deteriorates due to thinning of the trace, skipping and fading. Such deterioration can reach the point where the graphic information being displayed is no longer intelligible or suitable for its intended purpose. Plotting systems are used to produce master transparencies for photoetching items such as printed circuit boards. Such transparencies must have constant uniformity with high contrast throughout in order to have a master suitable for etching or other reproduction methods.

To limit the deterioration in line quality, pressurized ballpoint pens have been employed in the past. However, due to the inherent limitations of the ballpoint, such as its tendency to skip, to accumulate dirt and to blot the paper, a high quality drawing with good contrast and line clarity cannot be achieved at all speeds.

The problem of obtaining uniform traces over a broad speed range and one solution to that problem are discussed in greater detail in the copening U.S. Pat. No. 3,781,907 issued Dec. 25, 1973 and having the same assignee as the present invention. In that application, an apparatus is disclosed in which a pump is driven at a speed proportional to the velocity of the plotting pen in the recording medium. The pump is designed to have a linear flow-versus-speed characteristic at the low flow rates required of a plotting pen. The apparatus disclosed in the application is one solution to the problem; however, due to the difficulty and cost of maintaining a true linearity in the servo drive system as well as in the pump over a full range of speeds from zero to, for example, 3,000 ipm, another solution has been sought.

It is, accordingly, a general object of the present invention to provide a method and apparatus for expressing writing fluid from a plotting pen by controlling the pressure on the writing fluid within the pen exclusively at higher plotting speeds where the normal forces drawing the fluid from the pen are incapable of maintaining high quality of line characteristics.

SUMMARY OF THE INVENTION

The present invention resides in a method and apparatus for expressing writing fluid from a plotting pen onto a recording medium while the pen and medium are moved relative to one another in a plotting device in accordance with plotting commands supplied by a controller. Velocity signal generating means produces speed or velocity signals representative of the rate of movement of the plotting pen and recording medium relative to one another. Fluid pumping means, such as a centrifugal pump, is connected to the plotting pen for pressurizing the writing fluid in the pen and forcing the fluid from the pen at an increased flow rate. Control means is connected between the signal generating means and the pumping means for driving the pumping means in response to the velocity signal above a predetermined threshold level. The threshold level must be exceeded by the velocity signal in order to initiate the pump operation and until the threshold level is reached, pump operation is inhibited.

By driving the pump and pressurizing the fluid within the pen only at higher plotting speeds, the pen is permitted to write upon the recording medium at low speeds by dispensing fluid in its normal manner. When the threshold level corresponding to the plotting speed at which line quality begins to deteriorate is exceeded, the pressurization of the writing fluid augments the fluid flow through the pen. Line quality at lower speeds is maintained as before, and at higher speeds the added pressurization contributes to the maintenance of consistent line characteristics.

DESCRIPTION OF THE PREFERRED EMBODIMENTS

Figure 1:
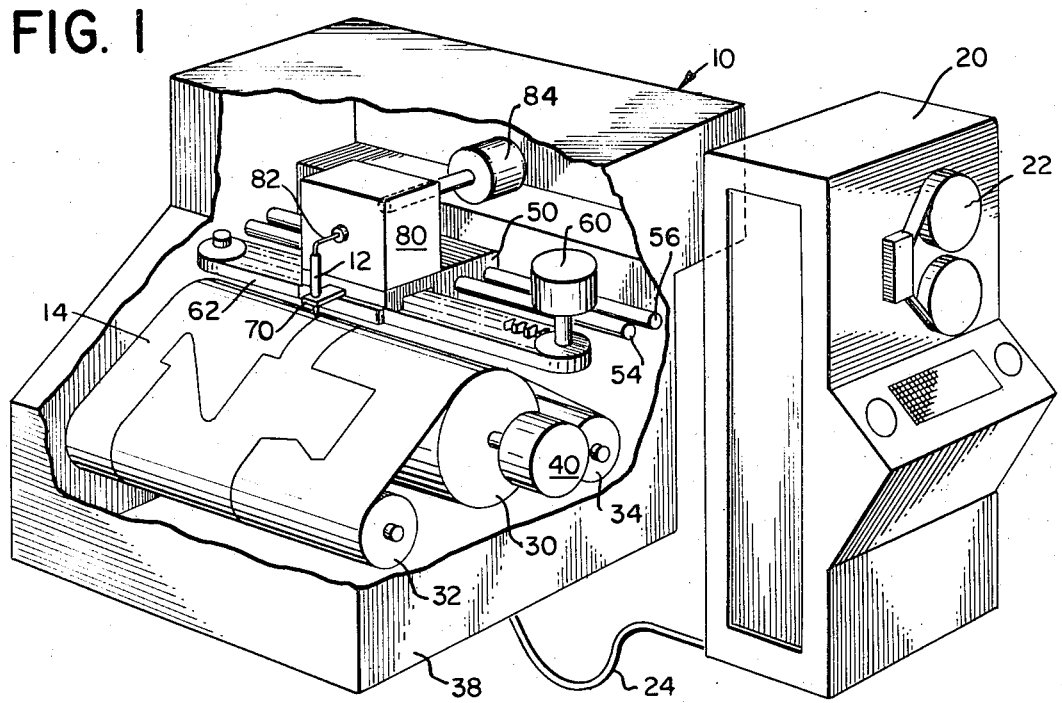
FIG. 1 is a perspective view of a plotting device including apparatus for expressing writing fluid from the plotting pen in accordance with the present invention.

FIG. 1 is a perspective view of a plotting device, generally designated 10, in which a plotting pen 12 and a recording medium 14 are moved relative to one another in response to plotting commands received from a control computer 20. In accordance with the present invention the plotting device 10 includes apparatus for expressing writing fluid from the pen 12. It should be recognized, however, that other types of plotting devices such as those mentioned above may also utilize the apparatus of the present invention with equal utility and advantage.

The general operation of the plotting device 10 follows. The control computer 20 derives plotting information either "on line" from another mechanism producing the information or from a previously prepared memory device such as the magnetic or punched tape 22. In either event, the information to be recorded is processed by the control computer 20 and is converted to analogue or digital plotting commands which are transmitted to the device 10 through the control cable 24.

In the plotting device 10, the recording medium 14, shown as a strip of recording paper, film or other recording material, rests upon and is engaged by a plotting drum 30 with the ends of the strip reeled onto storage rolls 32 and 34. Both the storage rolls and the drum are rotatably mounted in the housing 38. A drive motor 40 is connected to the plotting drum for rotating the drum and advancing the medium 14 back and forth in the longitudinal direction, which, for the purposes of definition, is called the X coordinate direction or control axis. Accordingly, the drive motor 40 is referred to hereinafter as the X-drive motor. One of the plotting commands transmitted to the device 10 from the computer 20 is a control signal governing the operation of the drive motor 40 and the motion of the medium 14 in the X-coordinate direction. The medium is threaded onto the plotting drum 30 by means of sprockets (not shown) in order to maintain precise correlation of its movement with the commands generated by the computer. The storage rolls 32 and 34 are driven through slip clutches (not shown) to maintain the portion of the strip over the drum under a slight tension.

The plotting pen 12 forms a part of the plotting head which is mounted on a carriage 50. The carriage is slidably supported by a pair of rails 54 and 56 extending parallel to the drum 30 for movement generally transverse to the recording medium 14. A drive motor 60 mounted within the housing of the device 10 is drivably connected to the carriage 50 by means of a toothed drive belt 62. For the purpose of definition, the direction extending transverse to the recording medium or parallel to the axis of the plotting drum 30 is called the Y-axis and the drive motor 60 is, accordingly, referred to hereinafter as the Y-drive motor. Plotting commands from the computer 20 also control the operation of the motor 60 and the movement of the pen 12.

The pen 12 is supported in generally perpendicular relationship to the recording medium and plotting surface of the drum 30 by means of a cantilevered mounting arm 70 which is pivotally connected to the carriage 50 to allow slight vertical movements of the pen to bring the writing tip of the pen and the recording medium into and out of writing engagement. A solenoid (not shown) controls the lifting of the pen out of contact with the recording medium and a spring (not shown) pivots the arm 70 downward to establish contact between the pen and the medium. The computer 20 also produces plotting commands for the solenoid to control the vertical movement of the pen. Associated with such commands and movements is the control axis designated the Z-axis.

Turning more particularly to the present invention, a fluid pump 80 including a writing fluid reservoir, is also mounted on the carriage 50 with the pen 12. The pump 80 is preferably a centrifugal pump having an output connected through a flexible tubing 82 to the plotting pen 12. A pump drive motor 84 is also supported on the carriage 50 and is connected in driving relationship to the pump 80.

The pump 80 pressurizes the writing fluid in the pen 12 when the motor 84 is energized. With a centrifugal pump, the output pressure, and consequently the pressure of the writing fluid in the pen 12 increases as the speed of the drive motor 84 increases. Rapid accelerations and decelerations of the punp are also possible. The pump may be interposed between the writing fluid reservoir and the pen as shown, for example, in FIG. 5 or may pressurize the entire writing fluid system including the reservoir. In embodiments where the pump is interposed between the reservoir and the pen 12, leakage past the pump impeller must take place when the pump is not being driven so that the pen 12 is never without writing fluid. Most centrifugal pumps permit such leakage because there is a finite clearance between the impeller and the wall of the pumping chamber through which writing fluid may pass. Alternately, a separate supply line containing a check valve may be provided between the reservoir and the pen.

The plotting pen 12 must be adapted to receive fluid from the pump 80 and may have a construction such as that shown in the above-referenced U.S. Pat. No. 3,787,907. Writing fluid delivered to the pen by the pump may be an ink, an etchant or other fluid capable of producing a trace on the recording medium either directly or in conjunction with a developing process performed after the plotting operation.

In accordance with the present invention, the pump 80 is energized by the motor 84 exclusively at higher plotting speeds. In particular, the energization of pump motor 84 and the pump 80 is not initiated until the absolute relative velocity of the pen and recording medium exceeds a predetermined velocity. The predetermined velocity is established at a speed where the quality of the trace produced by the pen begins to deteriorate due to the inability of the pen to produce an adequate flow of writing fluid in the normal fashion, that is, by the combined forces of gravity, capillary action and the effect of the meniscus between the pen and the medium. The speed usually falls within the range of 200–400 ipm. Above this speed the pump 80 pressurizes the fluid within the pen 12 and thereby creates an additional force to express additional fluid from the pen. The pump 80 and motor 84 are controlled in such a manner that the pump produces a higher pressure with higher plotting speeds. Attending the higher pressures are the increased flow rates necessary to maintain substantially uniform line characteristics by depositing a uniform quantity of ink per unit of travel, regardless of the rate at which traces are produced.

Figure 2:
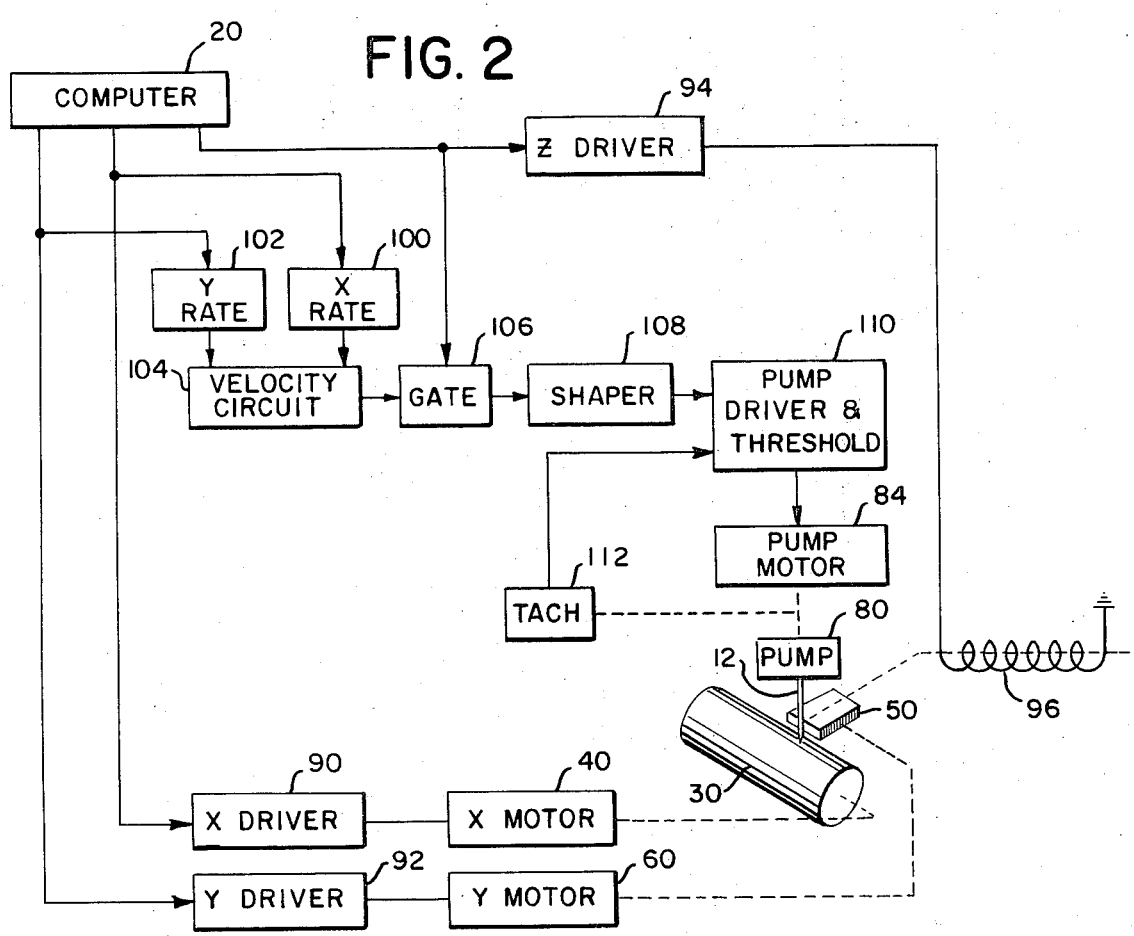
FIG. 2 is a schematic diagram showing control components forming the apparatus for expressing writing fluid in the plotting device of FIG. 1.

FIG. 2 discloses in a schematic diagram not only the controls for the X, Y and Z-axes but also the control mechanism for the pump 80 and motor 84. The computer 20 supplies plotting commands to an X-driver 90 and a Y-driver 92 connected respectively to the X-motor 40 and Y-motor 60 for moving the drum 30 and carriage 50 and producing relative movement between the pen 12 and recording medium 14. At the same time, pen commands are applied to the Z-axis drive 94 to actuate a solenoid 96 connected to the arm 70 in FIG. 1 and move the pen 12 into or out of writing contact with the medium.

An X-rate circuit 100 also receives the commands applied to X-axis driver 90 an derives a velocity signal representative of the movement of the pen transversely of the recording medium. A Y-rate circuit receives the commands applied to the Y-axis driver and derives a velocity signal representative of the translation rate of the recording medium over the plotting drum 30. In one embodiment of the invention in which the commands applied to the drivers 90 and 92 are digital motor pulses, the rate circuits 100 and 102 are pulse rate tachometers.

The two derived velocity signals are then combined algebraically by an absolute velocity signal source formed by circuit 104 which computes the composite or total relative velocity. The output signal is applied to the servo control mechanism for the pump 80 through a control gate 106 and a shaping circuit 108 described in greater detail below. The control gate is responsive to the Z-axis plotting command so that no velocity signal is transmitted to the pump controls when the pen 12 is lifted out of contact with the recording medium. As a consequence, when the pen 12 and recording medium 14 are rapidly traversed relative to one another and the pen is lifted, the servo control mechanism for the pump is de-energized and no writing fluid is expressed from the pen.

The velocity signal is transmitted by the shaping circuit is applied to a closed-loop servo control which energizes the pump motor 84. The control loop has a pump driver and threshold circuitry 110 which receives the velocity signal and energizes the pump motor whenever the velocity signal exceeds the threshold level to which the circuitry is adjusted. The threshold level is selected to correspond with the plotting speed at which line quality begins to deteriorate. The control loop also includes velocity feedback provided in one embodiment of the invention by a motor tachometer 112 which applies the velocity feedback signal to the input of the servo loop.

The shaping circuit 108 modifies the velocity signals from the circuit 104 in accordance with the pressure output desired of the pump 80. In its simplest form, the shaper is linear and simply transmits a signal proportional to the velocity signal to the servo control loop so that the pump 80 and motor 84 are driven at a speed directly proportional to the velocity signal. The pump 80 increases the pressure of the writing fluid in the pen in substantially the same manner. Alternately, the shaping circuit may provide a nonlinear output so that, for example, the pressure on the writing fluid is increased more rapidly as the plotting speed increases.

Figure 3:
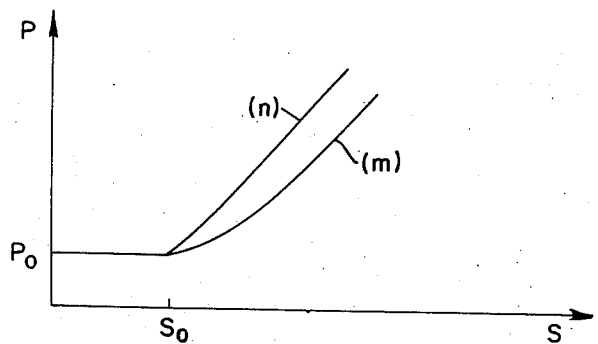
FIG. 3 is a graph showing the operating characteristics of the pump control circuitry in different embodiments of the invention.

FIG. 3 discloses curves showing the variation of pressure on the writing fluid as the plotting speed increases. Below the threshold level of the circuit 110, the static pressure head $P_o$ is constant and determined by the total height of the writing fluid in the reservoir above the tip of the pen. When the velocity signal exceeds the predetermined threshold level of the circuit 110 at the plotting speed $S_o$, operation of the pump 80 is initiated and the pressure head in the pen begins to increase as indicated by either the linear curve $(n)$ or the nonlinear curve $(m)$. If the shaping circuit is a simple resistive element or proportional amplifier, the curve $(n)$ might be followed. If a nonlinear shaping circuit is employed, the curve $(m)$ might be followed.

Figure 4:
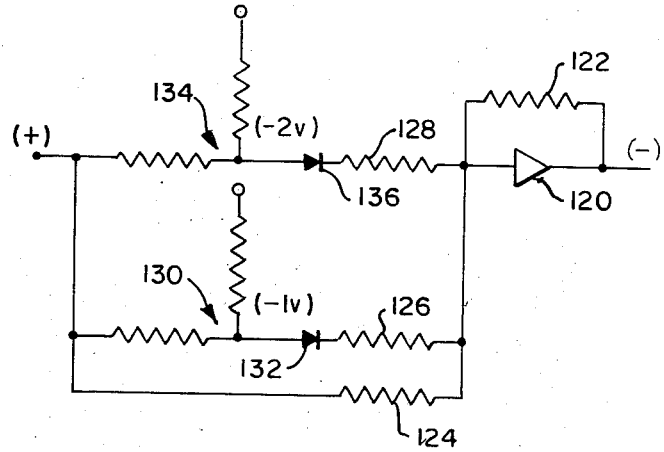
FIG. 4 is an electrical diagram of a nonlinear shaping circuit employed in one embodiment of the invention.

To produce the nonlinear curve $(m)$ in FIG. 3, a simple resistor-diode circuit such as shown in FIG. 4 can be employed. It is assumed in FIG. 4 that the incoming velocity signal is a positive voltage as indicated. The incoming signal is applied to an operational amplifier 120 having a feedback resistor 122 through three parallel resistors 124, 126 and 128. Resistor 126, however, is cut off by a negative bias circuit 130 and diode 132 until the velocity signal exceeds one volt. In a similar manner, resistor 128 is cut off by bias circuit 134 and diode 136 until the velocity signal exceeds two volts. Assuming that resistors 122 and 124 have the same value so that the amplifier initially has a gain of unity, and that the resistors 126 and 128 respectively produce gains of 10 and 100, the output characteristics of the shaping circuit will be substantially as shown by the curve $(m)$ in FIG. 3. A smoothing of the output characteristic is achieved primarily through the response characteristics of the diodes at low voltages. Of course, other types of shaping networks providing nonlinear outputs can be utilized depending upon the pressure variations desired as the plotting speed increases. The use of a linear or nonlinear shaping circuit and the slope of the curves in FIG. 3 produced by the circuit depend upon the size and flow characteristics of the pump 80 and the writing tip of the pen 12.

There are various means by which the operation of pump 80 can be inhibited until the plotting speed exceeds a preselected value. In one embodiment of the invention a threshold circuit is incorporated at the input of the servo control loop as shown in the schematic diagram of FIG. 5. Assuming that the velocity signal emitted by the shaping circuit is negative, as would be the case with the embodiment of the shaper shown in FIG. 4, the threshold circuit or level detector 140 performs an inhibiting function. An operational amplifier 142 having a feedback resistor 144 receives the velocity signal through the input resistor 146. A bias circuit comprised of a potentiometer 148 applies a positive bias voltage to the input of the amplifier 142 and prevents the output of the amplifier from assuming a positive value until the negative velocity signal exceeds the value of the positive bias voltage. Until the output of the amplifier 142 is positive, diode 150 is nonconductive and the servo amplifier 152 will not operate the motor 84 and the pump 80. During the interval before the velocity signal exceeds the predetermined value established by the bias voltage, the writing fluid flows through the centrifugal pump 80 from the reservoir 154 to the pen 12 without pressure augmentation by the pump. The potentiometer 148 can be adjusted to establish the threshold signal level, and hence the plotting speed, at which the motor 84 and pump 80 begin to operate. After the velocity signal applied to the threshold circuit 140 exceeds the threshold level, the closed loop control servo driving the pump operates until the plotting speed again drops below the predetermined value.

It will thus be seen that an apparatus and method have been disclosed for expressing writing fluid from a pen in a plotting device so that uniform line quality will be obtained over a broad range of speeds. The apparatus includes a pump which is driven exclusively at higher plotting speeds to pressurize the writing fluid in the pen and thereby deposit a uniform quantity of fluid per unit length of line.

Figure 5:
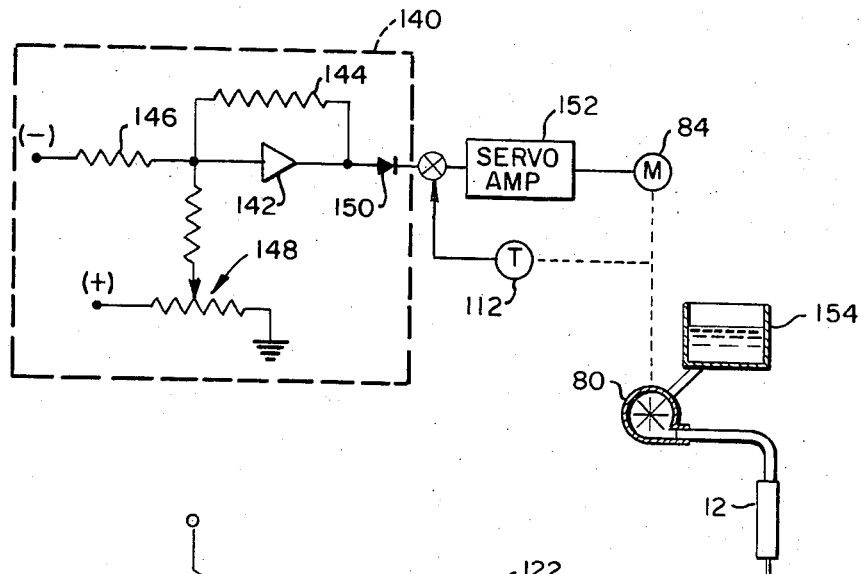
FIG. 5 is a schematic diagram showing the pump driver and threshold circuitry.

Although the apparatus of the present invention has been disclosed in several forms, it will be understood that still further substitutions and modifications can be had without departing from the spirit of the invention. For example, the velocity signal which drives the pump may not be derived from the plotting commands energizing the X and Y drive motors but, instead, may be read directly from a channel on the program tape 22. The threshold level at which the velocity signal initiates pump operation as plotting speed increases may be different from the signal level at which the pump operation ceases as the plotting speed decreases. This feature can be obtained by a conventional hysteresis circuit. The servo control loop can be an open loop provided that the servo amplifier produces substantially proportional outputs at the elevated plotting speeds. Of course, without motor velocity feedback there is no need for the motor tachometer 112. Many centrifugal pumps must be rotated in a given direction at all time to produce fluid pressure at the output. The specific control circuitry shown in FIG. 5 is suitable for such pumps; however, it should be realized that very simple centrifugal pumps are capable of producing pressure regardless of the direction of rotation. In such case velocity signal sources and threshold circuits providing both positive and negative outputs can be employed. Accordingly, the present invention has been described in several embodiments merely by way of illustration rather than limitation.

We claim:

1. Apparatus for expressing writing fluid from a plotting pen onto a recording medium while the pen and the recording medium are moved relative to one another in a plotting device in accordance with plotting commands supplied to the plotting device comprising: velocity signal generating means for producing a velocity signal representative of the rate of movement of the plotting pen and the recording medium relative to one another; fluid pumping means including a centrifugal pump permitting leakage of fluid through the pump in a static condition and connected to the plotting pen for forcing writing fluid from the pen at an increased rate; and control means connected between the velocity signal generating means and the pumping means for driving the pumping means in response to the velocity signal and having a predetermined threshold level which must be exceeded by the velocity signal to initiate driving of the pumping means and which inhibits operation of the pumping means until exceeded by the velocity signal, whereby the plotting pen is permitted to write upon the recording medium by dispensing fluid in a normal manner until the threshold level and the corresponding rate of movement are exceeded.

2. Apparatus for expressing writing fluid from a plotting pen as defined in claim 1 wherein:
the control means comprises shaping means receiving the velocity signal and producing an output signal varying in linear relationship with the velocity signal above the threshold level.

3. Apparatus for expressing writing fluid from a plotting pen as defined in claim 1 wherein:
the control means includes shaping means receiving the velocity signal and producing an output signal varying in a nonlinear relationship with the velocity signal above the threshold level.

4. Apparatus for expressing writing fluid from a plotting pen as described in claim 3 wherein the shaping means comprises a resistor-diode circuit.

5. Apparatus for expressing writing fluid from a plotting pen as defined in claim 1 wherein:
the control means has a predetermined threshold level adjusted to a value of the velocity signal corresponding to a rate of relative movement of the pen and recording medium of 200 ipm.

6. Apparatus for expressing writing fluid from a plotting pen as defined in claim 1 wherein the control means includes a threshold circuit including an amplifier and bias circuit connected to the input of the amplifier.

7. Apparatus for expressing writing fluid as defined in claim 6 wherein the threshold circuit further includes a diode connected to the poutput of the amplifier.

8. Apparatus for expressing writing fluid from a plotting pen as defined in claim 1 wherein:
the pumping means includes a pump drive motor connected in driving relationship to the centrifugal pump; and
the control means includes a closed servo drive loop connected to the pump drive motor and providing velocity feedback.

9. Apparatus for expressing writing fluid from a plotting pen as defined in claim 8 wherein the closed servo drive loop includes a tachometer driven by the motor and producing a velocity signal.

10. Apparatus for expressing writing fluid as defined in claim 1 further including:
means responsive to the plotting commands for moving the plotting pen and recording medium into and out of writing relationship; and
gating means also responsive to the plotting commands for interrupting the pressurizing of the writing fluid by the centrifugal pump when the pen and recording medium are out of writing relationship.

11. Apparatus as defined in claim 1 wherein:
the control means includes a level detector receiving the velocity signal and defining a predetermined threshold level which must be exceeded by the signal to initiate operation of the pump.

* * * * *